J. & W. C. BAILEY.
KITCHEN BOILER.
8830X
Patented May 22, 1835.
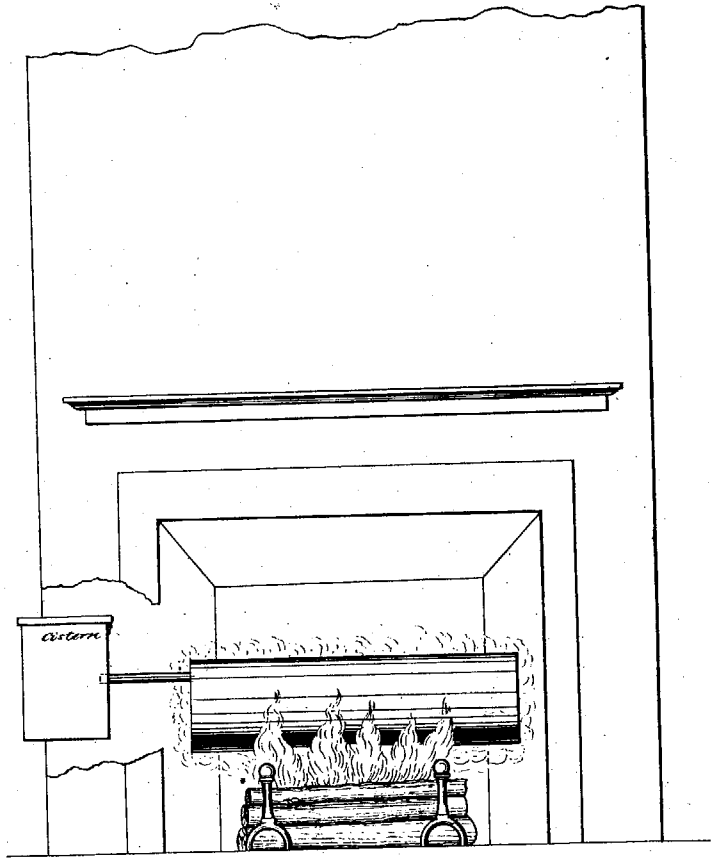
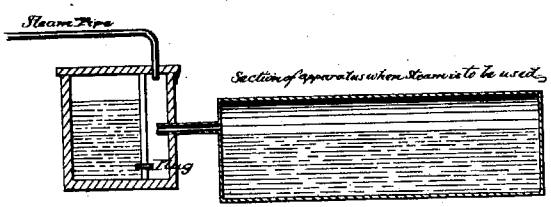
THE NORRIS PETERS CO., PHOTO-LITHO., WASHINGTON, D. C.

May 22, 1835 8830X

John Bailey & William C. Bailey, Farmington
State of Maine,

Letters Patent

The schedule referred to in these Letters Patent, and
making part of the same containing a description in the words
of the said John Bailey and William C. Bailey, themselves of their
improvement in a machine called a Kitchen Boiler, To all to whom these presents shall come
Be it known that we John Bailey and William C. Bailey
both of Farmington in the County of Kennebec and State of
Maine have invented a new and useful and improved ma-
-chine called a Kitchen Boiler for the purpose of heating water
for family use; and that the following is a full and
accurate description of the said machine in its several
parts, That part which is properly called the boiler
consists of a hollow cylinder of about twelve inches in
length and five or six inches in diameter which is of copper
or some other metallick substance of at least equal hardness
and density and is so constructed as to be firm, strong,
and water-tight, The cylinder in regard to its shape may
be round or it may have one or two flat surfaces and the
other circular as may be found most convenient in adap
-ting it to the place where it is to be situated but that
part of its surface which comes in contact with the fire
is always to be circular; it is placed in a cavity made
for its reception in the back of a common kitchen fireplace
which cavity in most cases is easily made by removing a
few bricks especially where there is a false back. The front
end of the cylinder is not to project forward any further than
to be even with the rest of the back of the fireplace of Drawing made which it becomes a component part, and if it were placed inward [illegible] inch farther than the surface of the back, provided the bricks at the bottom of it are tapered down a little it would receive the heat of the fire quite as well, and would be less liable to external injury, through the back part of the cylinder there is a tube in-serted, which is from one to two inches in diameter of a substance similar to that of the boiler and made perfectly firm and tight at the place of its insertion. This tube is not of any specified length but must always be long enough to reach through the back of the fire place or one of its Jambs and enter into a cistern which is there placed and which is to contain the water to be heated for use The tube passes from the boiler and enters into the cystern about half way from the bottom to its top in a straight line; or it may incline, so as to enter nearer the bottom in this case, the heat being thrust thus low down into the cistern, will be more readily diffused by its ascent; through the whole of the water which it contains, when there is no convenient place to set the cistern in the rear of the fire place it may be set by the side of one of the jambs; in this case the tube which communicates from it to the boiler must be inserted into one end of the boiler instead of its side as above described, The cistern consists of a box made of thick boards or plank with square corners, and is about two feet long, a foot and a half wide and a foot and a half high. the whole is fitty and firmly framed together so as to be strong and proof agaunt leaking, there is also a wooden cover attached to it which is hung with hinges and can be shut down so close as to prevent any steam from escaping out of the box except it be through a hole made for that purpose. The cover of the cystern being raised up cold water is turned in at the top until it is nearly filled, but the water must never stand much higher in the cystern than the top of the boiler in the chimney, lest by its pressure it should burst the
boiler, When the cistern is first filled with water the boiler
is full of air and cannot therefore be immediately filled with water
through the medium of the connecting tube, but as soon as a
moderate degree of heat is applied to the surface of the boiler the
air within is expanded and at once expelled through the tube
and water is let in to supply its place, the boiler is set into
the back of the fire place about ten or twelve inches above the
hearth, and when a moderate fire in the usual manner is
kindled below it. if it be only enough to boil a tea kettle
or to make a room comfortably warm in cold weather it
will in a short time render the water in the cistern through
the boiler and the tube sufficiently hot for washing clothes
dishes or any ordinary purposes for which hot water is usually
wanted, Here it will be perceived that besides the convenience
there is a great saving of fuel for without any extra fire
upon the hearth there may be from six to a dozen gallons of
water always hot, and ready for family use, the hot water
may be dipped out from the top of the cistern, the cover being
raised up for that purpose or it may be drawn off by a
cock or faucet inserted toward the bottom as may be most
convenient, There is still another use to be made of the kitchen
boiler, which has not yet been named, that is, of raising and
collecting steam, which when properly applied will answer
several purposes of cooking as that of potatoes in particular
as well as many other things when the steam is thus to
be used a distinct apparatus is necessary First a wooden slider is let down near the ~~mouth~~
of the tube across the cistern from top to bottom which
slider divides the water in the cistern into two sections
This is done to diminish the quantity of water to be set
on boiling in the act of steaming, The reason of this is
obvious, because the smaller the quantity of water the less

8830X heat will be required to convert it into vapour,

The Slider may be stationary and remain in its place provided a hole is bored through it, so that the water in both sections can communicate with each other in ordinary cases, but when steaming is going on it must be stopped, with a plug whereby all such communication is prevented, then the cover of the cistern is shut down tight and a hole is bored through either the end side or cover of the cistern as most convenient, through which a pipe of any suitable dimentions is inserted and which conveys the steam to another appropriate vessel, which is to receive the articles for cooking, to accelerate the steam process it will be necessary to increase the fire a little which comes in contact with the surface of the boiler above the hearth, The steam pipe may be rendered useful in another respect besides that for cooking, for it may be employed to convey away any excess of steam which may at any time arise from the cistern in consequence of too much heat, and which might otherwise be troublesome in the room, care is to be taken to keep so much water in the cistern as to fill the boiler, lest it should receive injury from the heat of the fire The dimensions of the above described machine in its several parts may be made larger or smaller according to the quantity of water intended to be heated, Dated at Warrington aforesaid this 25th day of April Anno Domini 1835, Witnesses
Thomas Bade
Hiram Bdiper John Bailey
William C. Bailey Expd.
[illegible]

(1488 words)